G. F. QUICK.
Incubator.
No. 40,277.
Patented Oct. 13, 1863.
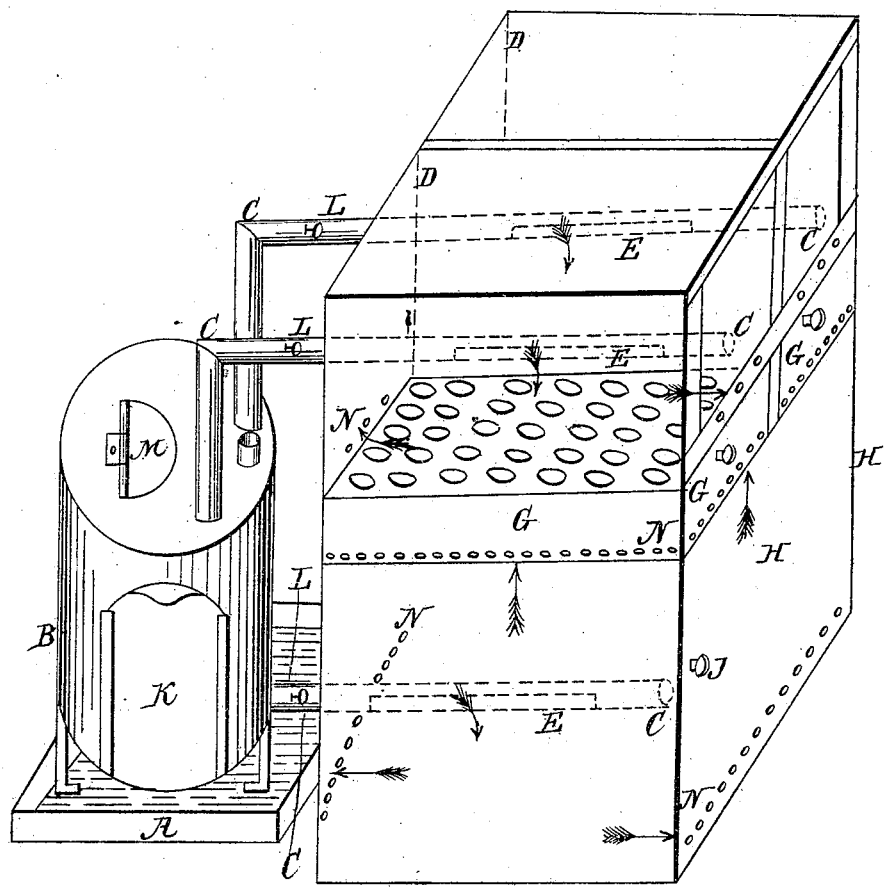

UNITED STATES PATENT OFFICE.

GEORGE F. QUICK, OF MOORESTOWN, NEW JERSEY.

IMPROVEMENT IN APPARATUS FOR HATCHING POULTRY.

Specification forming part of Letters Patent No. 40,277, dated October 13, 1863.

*To all whom it may concern:*

Be it known that I, GEORGE F. QUICK, of Moorestown, Burlington county, State of New Jersey, have invented new and useful Improvements in Machines for Hatching Poultry; and I do hereby declare that the following is a full and exact description thereof, reference being had to the accompanying drawing, and to the letters of reference marked thereon, making a part of this specification.

The nature of my invention consists in the arrangement of a drum with pipes having dampers and long apertures, the pipes projecting through the center of chambers, so as to discharge a natural warmth or heat from a stove, similar to animal heat, with the evaporation of water from a tank underneath, the heated air being conducted downward upon and around the eggs, which are deposited in perforated drawers inserted in the heated chambers, all in combination, so that the heated air is properly graduated and regulated.

To enable others skilled in the art to make and use my invention, I will proceed to describe its construction and operation.

A represents a square zinc or metal tank or pan, open at top, which is kept filled with water.

B represents an upright zinc or tin drum, that rests upon four feet some few inches above the water, and is intended to contain and surround a small coal stove. The bottom of the drum being open, so that the heat from the stove heats the water in the tank A underneath, and the warm vapor is drawn upward between the stove and the drum, when the vapor moistens the dry heat from the stove, and a pure, regular, and natural heat is maintained, which is neither too dry nor too damp. The heat thus passes up the pipes C C, and is conducted into the hatching house or chamber D, and discharged through the long apertures, E, the apertures or openings being at the lower side of the pipes C C, and the pipes C C extending above the eggs through the center to the front of the chamber D. The chambers D (of any number) are arranged in a row, and each chamber contains a drawer, G, which is filled with cotton, fine wood shavings, or any soft substance upon which the eggs (of any kind of poultry) are laid side by side, and the front and bottom of the drawers are perforated, as shown at letters N. Below the chambers D is another chamber or chicken-house, H, (the floor of which is covered with a comfortable carpeting or any soft substance,) which is likewise heated by a pipe, C, from the drum B, and in which the chickens when hatched are put and cared for, having a door, J, in front for ingress and egress, the bottom of the door and the back side of the pen H being also perforated, as marked N.

K is a sliding door through which to furnish the stove with fuel and regulate the draft.

L are dampers in the pipes C, to shut off or regulate the heat and draft passing from the drum to the chambers D; M, door at top to allow the heat to pass off, or for the purpose of feeding the stove with fuel in case an open-top stove is used.

The pipes C being above the eggs, the heat is applied to the top side of the eggs, where the proper and natural heat is required to produce and sustain the chicken, which lies at the bottom side of the egg. The heat from the chicken is counteracted and retained in the egg by the heat above, where, as in other hatching arrangements by ovens, &c., the heat is too great underneath, and the chicken is consequently destroyed in the egg, and as the greater heat is from above it is a more natural heat and more certain of producing the chicken. The heat passes down and around the egg on all sides, and the thermometer (one in each chamber) first regulating the degrees of heat, whereas, when the heat is conducted upon the egg from below and regulated by a thermometer above, the heat is too great and kills the chicken, heat ascending and only reaching the thermometer after it has commenced cooling; but, by the perforations N, in the bottom of the drawers and at the back and front sides of chambers D, the heat is by my invention moderated and regulated around the eggs on all sides, the heat from above forcing the cold air out below.

The heat of the chambers D is regulated by a thermometer suspended in each chamber, and the degrees of heat are kept ranged from 90 to 115 Fahrenheit, and in sixteen days the chicken is hatched. I generally use the highest degree of heat at first, so as to heat up the chamber D, and warm the eggs thoroughly as soon as possible, then graduate the heat lower and lower, averaging about 100 degrees.

By my invention, after the eggs are arranged (in the drawers) with the other devices, and the natural heat properly introduced into the chambers, I then have everything so secure as only to require attention and looking after once in about ten hours.

What I claim as my invention, and desire to secure by Letters Patent, is—

The arrangement of the devices of water-tank A, drum B, pipes C C, chambers D, perforated drawers, G, and chicken-house H, when arranged and combined as herein described, and for the purposes set forth.

GEO. F. QUICK.

Witnesses:
J. FRANKLIN REIGART,
JOHN S. HOLLINGSHEAD.